US012243699B2

(12) United States Patent
Gray

(10) Patent No.: US 12,243,699 B2
(45) Date of Patent: Mar. 4, 2025

(54) HIGH VOLTAGE SWITCH

(71) Applicant: Jeffrey Ross Gray, San Diego, CA (US)

(72) Inventor: Jeffrey Ross Gray, San Diego, CA (US)

( * ) Notice: Subject to any disclaimer, the term of this patent is extended or adjusted under 35 U.S.C. 154(b) by 0 days.

(21) Appl. No.: 17/568,435

(22) Filed: Jan. 4, 2022

(65) Prior Publication Data

US 2022/0367135 A1 Nov. 17, 2022

Related U.S. Application Data

(63) Continuation-in-part of application No. 17/319,018, filed on May 12, 2021, now Pat. No. 11,250,997.

(51) Int. Cl.
*H01H 47/00* (2006.01)
*H01H 50/54* (2006.01)
*H01H 50/64* (2006.01)

(52) U.S. Cl.
CPC .......... *H01H 47/001* (2013.01); *H01H 50/54* (2013.01); *H01H 50/643* (2013.01)

(58) Field of Classification Search
CPC .... H01H 47/001; H01H 50/54; H01H 50/643; H01H 3/26; H01H 2221/01; H01H 2221/022; H01H 2221/04; H01H 2221/048; H01H 1/205; H01H 1/2058; H01H 73/045; H01H 1/20; H01H 1/2041; H01H 1/22; H01H 1/225; H01H 3/32; H01H 33/6664; H01H 73/04; H01H 5/00; H01H 5/02; H01H 5/04; H01H 5/045; H01H 5/06; H01H 5/08; H01H 5/10; H01H 5/12; H01H 5/14; H01H 5/16; H01H 5/18; H01H 5/20; H01H 5/22; H01H 5/24; H01H 5/26; H01H 5/28; H01H 5/30; H01H 13/26; H01H 13/28; H01H 13/285; H01H 13/30; H01H 13/32; H01H 13/34; H01H 13/36; H01H 13/365; H01H 13/38; H01H 13/40; H01H 13/42; H01H 13/44; H01H 13/46; H01H 13/48
See application file for complete search history.

(56) References Cited

U.S. PATENT DOCUMENTS

| | | | | |
|---|---|---|---|---|
| 5,861,784 | A * | 1/1999 | Heise | H01H 83/20 335/14 |
| 7,864,491 | B1 * | 1/2011 | Bauder | H01H 9/30 361/13 |
| 10,020,131 | B2 * | 7/2018 | Chen | H01H 9/0038 |
| 11,250,997 | B1 * | 2/2022 | Gray | H01H 1/22 |
| 2014/0246298 | A1 * | 9/2014 | Errico | H01H 1/06 200/48 R |
| 2018/0286620 | A1 * | 10/2018 | Schmoelzer | H01H 71/0264 |

* cited by examiner

*Primary Examiner* — Lheiren Mae A Caroc

(57) ABSTRACT

A high-voltage switch is disclosed. The switch includes a substrate, a first contact fixedly coupled to the substrate, a second contact having a first position in conductive contact with the first contact and a second position not in conductive contact with the first contact; and an actuator comprising a body fixedly coupled to the substrate and a movable element coupled to the second contact. The actuator is configured to selectably move the second contact between its first and second positions. The switch has a breakdown voltage greater than or equal to 500V and does not include an arc suppression element.

10 Claims, 4 Drawing Sheets

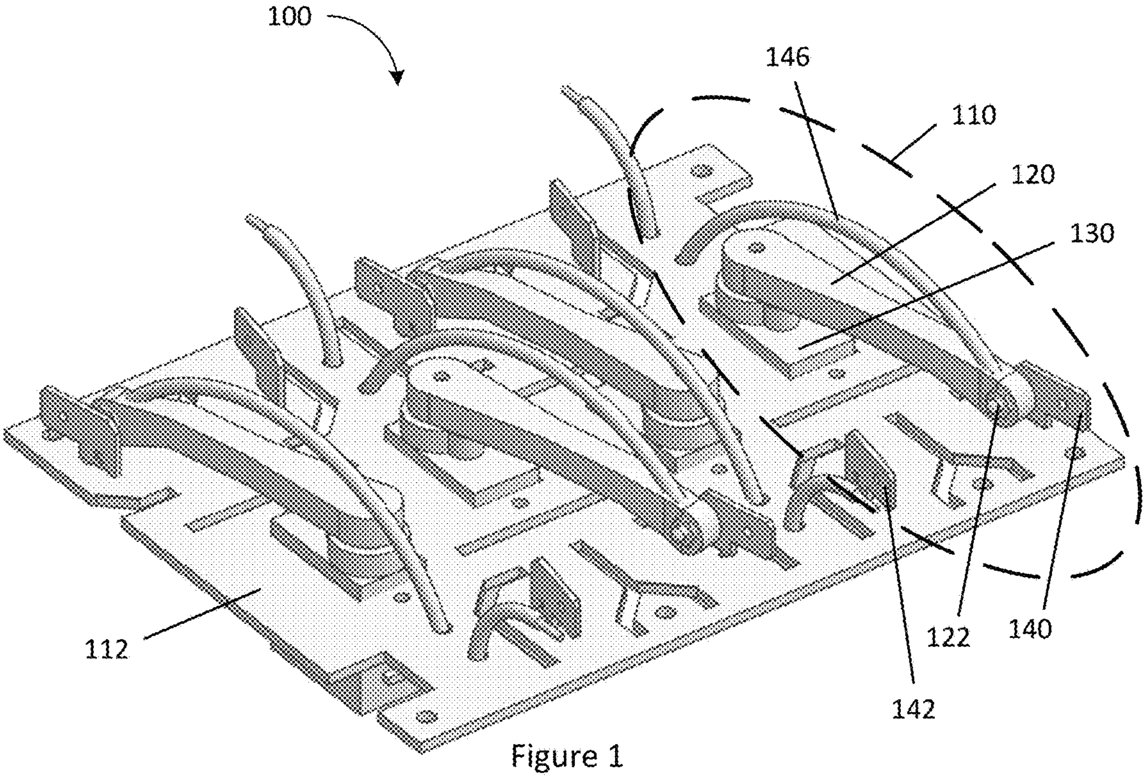
Figure 1
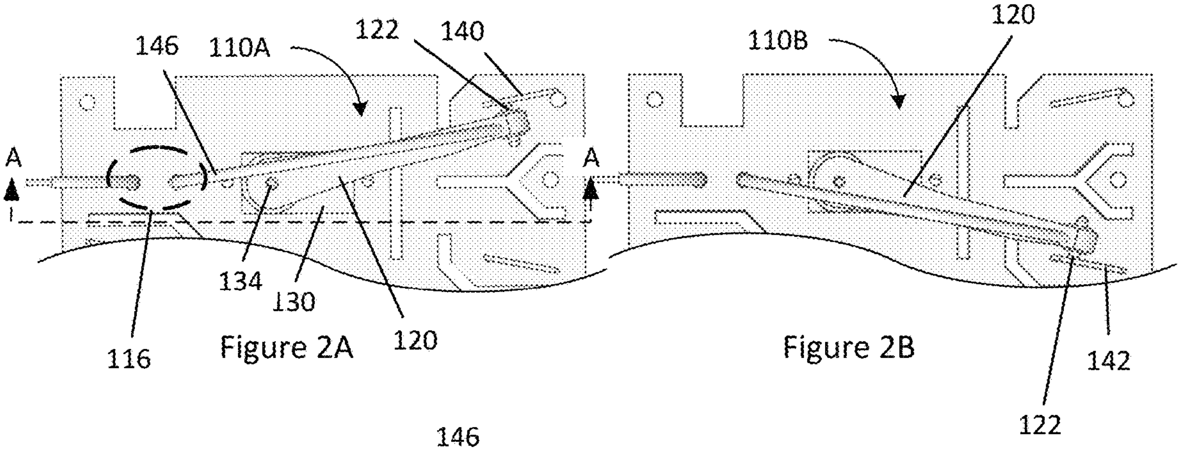
Figure 2A
Figure 2B
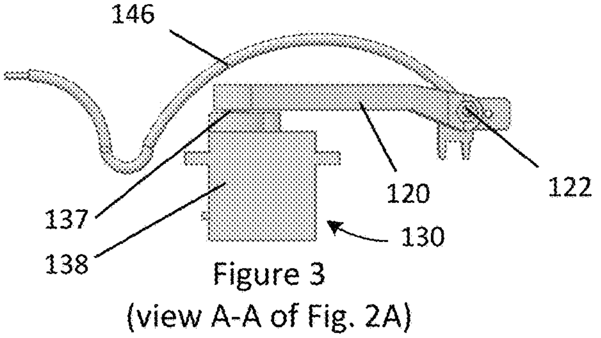
Figure 3
(view A-A of Fig. 2A)

HIGH VOLTAGE SWITCH

CROSS-REFERENCE TO RELATED APPLICATIONS

This application claims priority to U.S. application Ser. No. 17/319,018 filed on May 12, 2021, which is incorporated herein by reference in its entirety.

STATEMENT REGARDING FEDERALLY SPONSORED RESEARCH OR DEVELOPMENT

Not applicable.

BACKGROUND

Field

The present invention generally relates to a switch in a circuit carrying a high voltage.

Description of the Related Art

Conventional designs for switching devices in high-voltage circuits typically focus on preventing formation of an electrical arc when breaking an energized circuit. These devices frequently include clamping circuits around the contacts. Other features intended to prevent or mitigate the formation of an arc include an enclosure surrounding the contacts, the enclosure containing one of a vacuum, an inert gas, or a fluid. Some devices use exotic materials for the contacts, for example molybdenum and/or tungsten to increase the momentary discharge current rating, which reduces the continuous current rating and increases cost. Silver contacts are used when it is necessary to maintain the full continuous current rating after arcing occurs. Contacts are often shaped with large radii to reduce the risk of arc formation. All of these designs add complexity and cost and reduce the reliability of the switch.

Conventional switching devices typically use solenoids to move the contacts into and out of contact so as to minimize the switching time, during which the contacts are at a reduced distance and more susceptible to formation of an arc. Switching times of ~10 msec are available. Solenoids are often paired with a return spring and thus the solenoid must be continuously energized to maintain the contacts in a first position and return to a second position when the solenoid is de-energized.

SUMMARY

It is desirable to provide a simple and reliable switch for reconfiguring a high-voltage circuit while in an unpowered state.

An apparatus for reconfiguring a high-voltage circuit is disclosed. The apparatus has a planar substrate, a non-conductive arm with a first contact configured to be electrically connected to a first element of the high-voltage circuit, and a rotary actuator having a body fixedly coupled to the substrate and a rotatable element fixedly coupled to the arm. The actuator is configured to selectably rotate the arm between a first position and a second position relative to the substrate. The apparatus also has a second contact fixedly coupled to the substrate such that the first contact makes conductive contact with the second contact when the arm is in the first position. The second contact is configured to be electrically connected to a second element of the high-voltage circuit. A breakdown voltage of the apparatus is greater than or equal to 500V.

A high-voltage switch is disclosed. The switch includes a substrate, a first contact fixedly coupled to the substrate, a second contact having a first position in conductive contact with the first contact and a second position not in conductive contact with the first contact, and an actuator comprising a body fixedly coupled to the substrate and a movable element coupled to the second contact. The actuator is configured to selectably move the second contact between the first and second positions. The switch has a breakdown voltage greater than or equal to 500V. The switch does not include an arc suppression element.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 1 is a perspective view of an exemplary set of high-voltage switches, according to certain aspects of the present disclosure.

FIGS. 2A-2B are top views of a switch of FIG. 1 in first and second positions, according to certain aspects of the present disclosure.

FIG. 3 is a side view of a switch of FIG. 1, according to certain aspects of the present disclosure.

DETAILED DESCRIPTION

Figure 4:
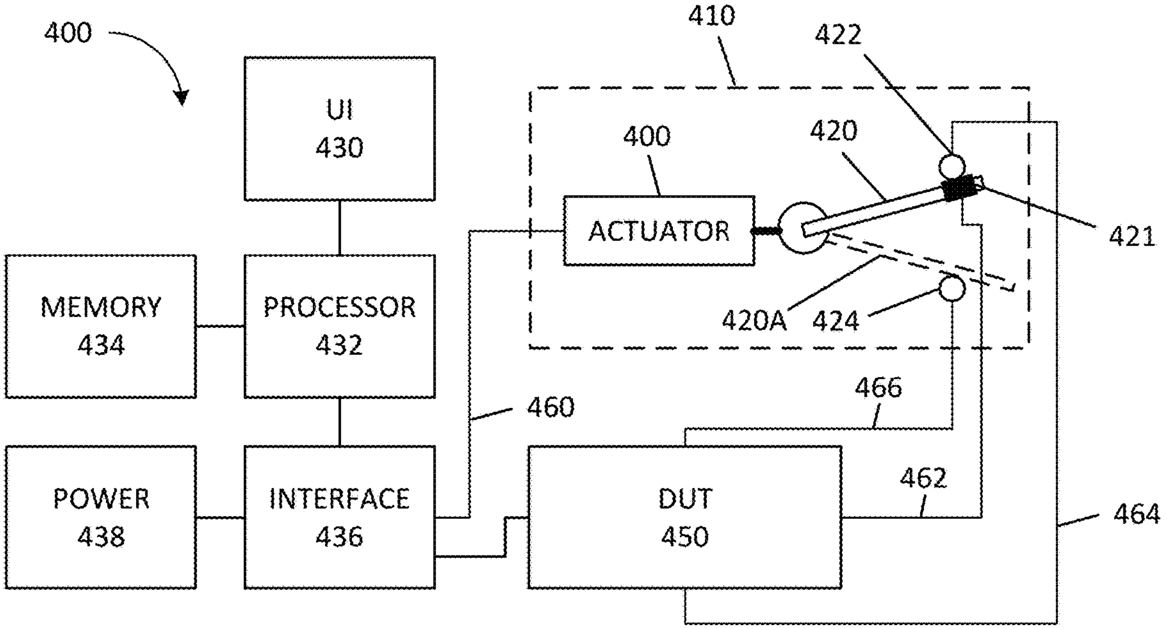
FIG. 4 depicts an exemplary schematic of a high-voltage switch as part of an electrical circuit, according to certain aspects of the present disclosure.

The following description discloses embodiments of a switch for reconfiguring a high-voltage circuit while in an unpowered state.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form to avoid obscuring the concepts of the subject technology. Like, or substantially similar, components are labeled with identical element numbers for ease of understanding.

As used within this disclosure, the phrase "advisory body" means an organization that produces commonly adopted rules or guidance for an industry. This includes private organizations such as Underwriters Laboratories (UL), professional groups such as the American Society of Mechanical Engineers (ASME), government organizations such as the Occupational Safety and Health Administration (OSHA), and international standards organizations such as the International Electrotechnical Commission (IEC).

As used within this disclosure, the abbreviations "VAC" and "VDC" have their usual meaning in referring to voltages of alternating current and direct current systems. A reference to a voltage level "V" without either of these abbreviations includes both VAC and VDC references.

As used within this disclosure, the phrase "high voltage" means a voltage that is sufficient to form an arc when contacts are separated. Unless explicitly stated otherwise, a high voltage is at least 1000V for alternating current and at least 1500V for direct current.

As used within this disclosure, the phrase "low voltage" includes a voltage that is not a high voltage. In certain embodiments, low voltage can refer to ranges such as 0-500V, 0-240V, 0-120V, 0-20V, 0-12V, and 0-5V.

As used within this disclosure, the term "clearance" has its usual meaning and is interchangeable with the phrase "clearance distance."

As used within this disclosure, the term "creepage" has its usual meaning and is interchangeable with the phrase "creepage distance."

As used within this disclosure, the phrase "breakdown voltage" means the voltage difference between two exposed conductors will cause an electrical current to flow through the air or along an intervening surface between the two conductors. The breakdown voltage of a device, also referred to as the "voltage rating" or "rated voltage" of the device, is determined by the lowest breakdown voltage between any exposed conductors within the device, based on the clearance and creepage between each possible pair of the exposed conductors. For a device to have a stated breakdown voltage, every clearance and creepage must have a respective breakdown voltage that is greater than or equal to the breakdown voltage of the device.

FIG. 1 is a perspective view of an exemplary set 100 of high-voltage switches 110, according to certain aspects of the present disclosure. Each switch 110 has an arm 120 with a conductive contact 122 to which is connected wire 146 that is further connected to a first element of an external high-voltage circuit (not shown in FIG. 1). The arm 120 is attached to a rotary actuator 130 that is mounted to a non-conductive planar substrate 112. In certain embodiments, the planar substrate 112 is a Fiberglass Reinforced Plastic (FRP) panel such as used for circuit boards. In certain embodiments, the planar substrate 112 has a thickness of 5 mm or less. In certain embodiments, the planar substrate 112 has a thickness of 2 mm or less. In certain embodiments, the planar substrate 112 has a thickness of 1 mm or less. In certain embodiments, the switch 110 is disposed in ambient air and is configured to be visual inspected without disturbing a seal, for example a liquid-tight seal or a hermetic seal.

There are two conductive contacts 140, 142 mounted to the substrate 112. In certain embodiments, the contacts 140, 142 comprise flat metal tabs with low-radius corners. In certain embodiments, the contacts 140, 142 comprise stamped sheet metal tabs with an exposed sharp edge. In certain embodiments, the edge will have a radius of less than or equal to 1 mm. In certain embodiments, the edge will have a radius of less than or equal to 0.4 mm. In certain embodiments, the edge will have a radius of less than or equal to 0.1 mm. In certain embodiments, one of the contacts 140, 142 is connected to a second elements of the external high-voltage circuit, for example by standard spade terminals that slide onto a portion of the contacts 140, 142, so that the switch 110 makes and breaks a connection of the first and second elements of the external high-voltage circuit.

FIGS. 2A-2B are top views of a switch 110 of FIG. 1 in a first position 110A and a second position 110B, according to certain aspects of the present disclosure. The contact 122 is in conductive contact with contact 140 in the first position shown in FIG. 2A. The contact 122 is in conductive contact with contact 142 in the second position shown in FIG. 2B. A wire 146 is conductively coupled to contact 122 and electrically isolated from other elements of the switch 110. The two holes in the substrate 112 indicated by the dashed line 116 form a strain relief for the wire 146.

The actuator 130 is configured to selectably move the arm 120 either the first or second position. In certain embodiments, the actuator 130 is a bi-directional rotary actuator. In certain embodiments, the actuator 130 is a low-voltage servo motor. A rotary actuator is different from a linear actuator, also referred to as a solenoid. A linear actuator has a movable element that slides linearly with respect to its body, while a rotary actuator has a rotatable element that is able to perform multiple complete unidirectional rotations relative to its body. A rotary actuator may comprise internal gearing such that an exposed rotatable element may rotate only over a portion of a complete rotation while the internal rotatable element completes multiple complete unidirectional rotations. Connection of the linear movable element of a solenoid to a linkage that produces a nonlinear motion does not transform a solenoid into a rotary actuator. In certain embodiments, the actuator 130 is energized in a first manner to rotate in a first direction and energized in a second manner to rotate in a second direction opposite the first direction. In certain embodiments, the rotary actuator 130 is one of a servo motor, a stepper motor, or a gear motor. In certain embodiments, the actuator 130 will hold the arm 120 generally immobile while de-energized. In certain embodiments, the actuator 130 is energized to move the arm 120 to one of the first and second positions then de-energized. If the contact 122 comprises a compliant element, discussed further with respect to FIG. 7, the first or second positions may be such that the compliant element is deformed when the arm is in the first or second position such that a slight retrograde movement of the arm 120 will not disengage the contact 122 from the fixed contact 140, 142. In certain embodiments, one or more of contacts 140, 142 has a surface comprising gold. In certain embodiments, one or more of contacts 140, 142 has a surface plating of gold.

Speed of reconfiguration of the circuit by the switch 110 is not a significant issue, as the reconfiguration is performed while the circuit is not energized and therefore not at risk for the creation of an arc. While conventional high-voltage switches are configured to complete the movement in a fraction of a second, the switch 110 operates at a much slower speed that enables the use of components having one or more of a lower cost or a higher reliability. In certain embodiments, the time for the actuator 130 to move the arm 120 from its first position to its second position is at least 1 second. In certain embodiments, the time is at least 2 seconds. In certain embodiments, the time is greater than 2 seconds.

The arm 120 has an isolation length that is the direct distance from any conductive feature of contact 122, disposed at a first end of the arm 120, the conductive shaft of the actuator 130, disposed at attachment point 134 and proximate to a second end of the arm 130 that is opposite the first end. In certain embodiments where the coupling of the arm 120 to the actuator 130 does not include a conductive shaft, the isolation length is the minimum separation distance along a continuous surface between the conductive features of the contact 122 and the nearest ground or circuit element. The exemplary switch 110 has a ratio of the isolation length to the thickness of the substrate 112. In certain embodiments, the ratio of the isolation length to the thickness is greater than or equal to ten. In certain embodiments, the ratio of the isolation length to the thickness is greater than or equal to twenty. In certain embodiments, the ratio of the isolation length to the thickness is greater than or equal to thirty.

FIG. 3 is a side view A-A of the switch 110 of FIG. 2A, according to certain aspects of the present disclosure. The arm 120 is connected to the movable member 137 of actuator 130. One end of contact 112 is visible and wire 146 passes through a passage (not visible in FIG. 3) through the arm 120 and is conductively connected to the contact 122. The body 138 of actuator 130 is attached to substrate 112, which has been omitted for clarity.

FIG. 4 depicts an exemplary schematic of a high-voltage switch 410 as part of an electrical circuit 400, according to certain aspects of the present disclosure. The switch includes a arm 420, shown in a first position with a second position 420A indicated in dashed line, and contact 421 coupled to the end of the arm 420. Contacts 422, 424 make conductive contact with contact 421 when the arm 420 is in the first and second positions, respectively. the contacts 421, 422, 424 are coupled, in this example, to a Device Under Test (DUT) 450 through wires 462, 464, and 466, respectively. Power can be provided by the power module 418 through interface 436 to the DUT 450. In certain configurations, voltage differences may be present between any pair of the contacts 421, 422, 424 as well as between any of contacts 421, 422, 424 and another conductive element, for example the actuator 400, that may grounded or at a low voltage.

The configuration of the DUT 450, the power module 438 and the switch 410 is controlled, in this example, by processor 432 that is connected to a memory 434 and a user interface (UI) 430. The memory 434 may contain instructions that, when loaded into the processor 432, cause the circuit 400 to be configured to test the attributes of the DUT 450.

In general, the switch 410 is operated to move the arm 420 between the first position, shown in FIG. 4, and the second position 420. The reconfiguration of the switch 410 is generally done while the contacts 421, 422, 424 are not energized. In certain circumstances, for example if the DUT 450 or power module 438 incorporate current limiting features, the arm 420 may be moved from the first position to the second position while current is flowing through contacts 421, 422 and separation of the contacts 421, 422 will create a voltage difference between the contacts 421, 422.

Figure 5:
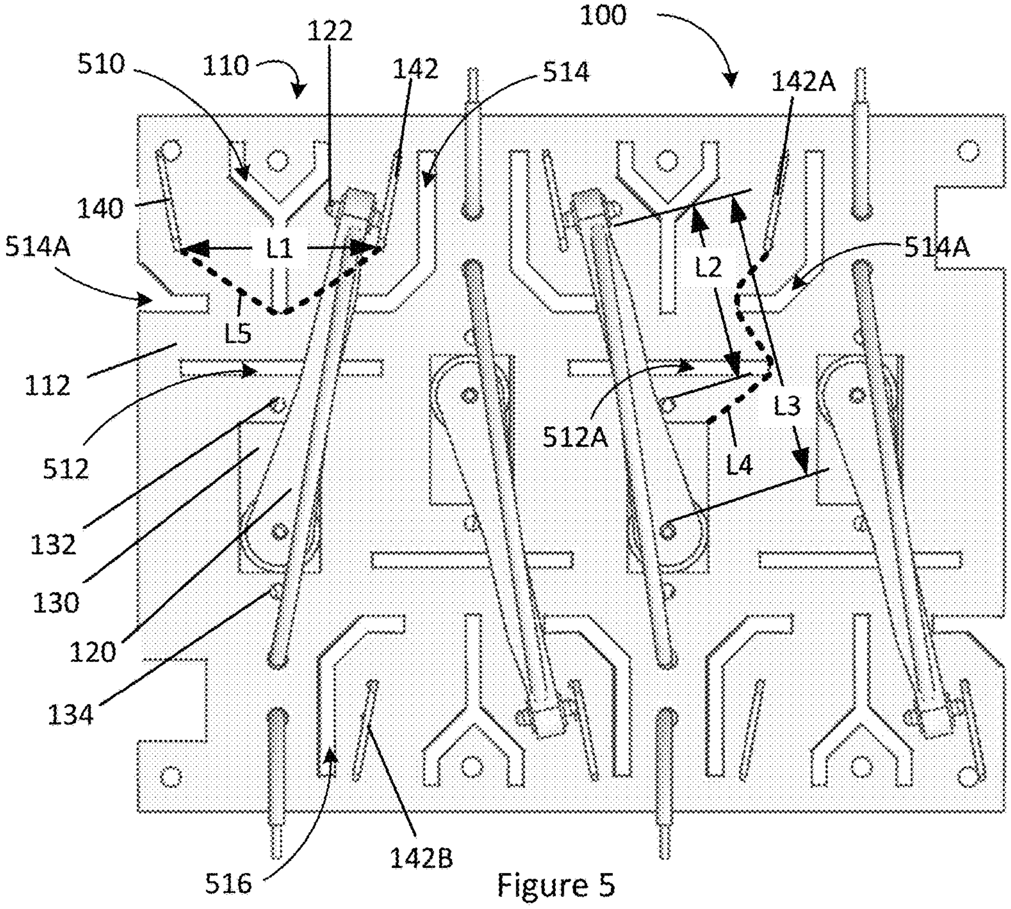
FIG. 5 is a plan view of the set of high-voltage switches of FIG. 1, according to certain aspects of the present disclosure.

FIG. 5 is a plan view of the set 100 of high-voltage switches 110 of FIG. 1, according to certain aspects of the present disclosure. The voltage rating of a device is determined by the creepage, which is the shortest continuous distance along a surface between conductive elements, and the clearance, the shortest distance through the air between conductive elements, of the device.

The contacts 140 and 142 are separated by a clearance distance L1 that has an associated breakdown voltage that is greater than the operating voltage of the switch 110. For a given geometry of the contacts 140, 142 and a minimum separation between the surfaces of the contacts 140, 142, there will be a voltage at which an arc will form in air between the contacts 140, 142. For reference, the dielectric breakdown strength of dry air, at Standard Temperature and Pressure (STP), between spherical electrodes is approximately 33 kV/cm. The arm 120 is long enough to create a first clearance distance from each of contacts 140, 142 to the nearest conductive feature of the actuator 130 and a second clearance distance between contacts 140 and 142. For both clearances, that the associated breakdown voltages are greater than the operating voltage of the switch 110. The angular motion of the arm 120 between the first and second positions is such that the contact 122 comes into conductive contact with each of contacts 140, 142 at the first and second positions, respectively.

The contact 122 and the actuator 130, presuming that the attachment screw 132 is in conductive contact with the actuator 130 in this example, are separated by a clearance distance L2. The creepage distance between the contact 122 and the actuator 130 is along the arm 120 and therefore is L3, recognizing that the actual length is determined by the intervening profile of the arm 120.

The creepage distance between the contacts 140 and 142 and from each the contact 140, 142 to the actuator 130 are determined by the shortest continuous path along a surface of the substrate 112. Air gaps 510, 512, 514, and 516 have been created by cutting grooves through the substrate 112. A properly positioned air gap increases the length of the creepage distance between conductors by forcing the shortest path to now go around the air gap. The creepage between two conductors disposed on a substrate with an air gap between two conductors will be larger than the equivalent creepage distance between the same conductors would be in the absence of the air gap. For example, the creepage distance between the contact 142 and the actuator 130, however, must follow the path around air gaps 514A and 512A suggested by the dashed line L4 and is larger than the creepage between the same two conductors would be in the absence of air gap 512A. Similarly, the creepage distance L5 between contacts 140 and 142 created by airgap 512 is larger than the creepage distance would be in the absence of air gap 512, which would be approximately the same as L1.

The first air gap creates a creepage distance between the second contact and the actuator that is larger than the creepage distance between the second contact and the actuator would be in the absence of the first air gap. The second air gap creates a creepage distance between the second contact and the third contact is larger than a creepage distance between the second contact and the third contact would be in the absence of the second air gap. The first, second, and third creepage distances each provide at least the breakdown voltage of the switch 110.

Air gap 510 is disposed between contacts 140 and 142 and increases the creepage between them. Similarly, air gaps 512 and 514, 514A increase the creepage between the actuator 130 and each of contacts 140, 142. In certain embodiments, air gaps 512 and 514 are effectively a single air gap between contact 142 and the actuator 130, as the layout retains structural unity of the substrate while creating a tortuous path along the surface of contiguous substrate from one conductor to the other. In certain embodiments, an air gap may comprise multiple non-contiguous air gaps that together increase the creepage between exposed conductors.

In certain embodiments, an air gap may be replaced by a nonconductive structure, for example a corrugated sheet, that increases the surface distance connecting two points in 3D space as compared to the surface distance of the substrate without the structure.

The substrate 112 is completely nonconductive so as to increase the minimum creepage and clearance of switch 110 by eliminating all peripheral conductive elements. There are no electrical traces or metallization on the surface of the substrate 112.

Figure 6A:
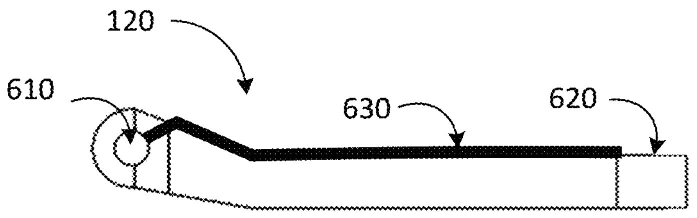
FIGS. 6A-6B depict exemplary switching arms, according to certain aspects of the present disclosure.

FIG. 6A depicts exemplary switching arm 120, according to certain aspects of the present disclosure. Arm 120 is nonconductive, i.e. comprises no conductive elements, and has a creepage distance 630, shown in the thick black line, from the bore 610 where a contact (not shown in FIG. 6) will be mounted, to the vertical bore 620 that will fit onto a shaft of the actuator (not shown in FIG. 6). This line is the shortest surface distance between the conductive contact and a conductive feature of the actuator and is a limiting factor in the voltage rating of the high-voltage switch. This example may have suitable for a switch rated for 5000V.

Figure 6B:
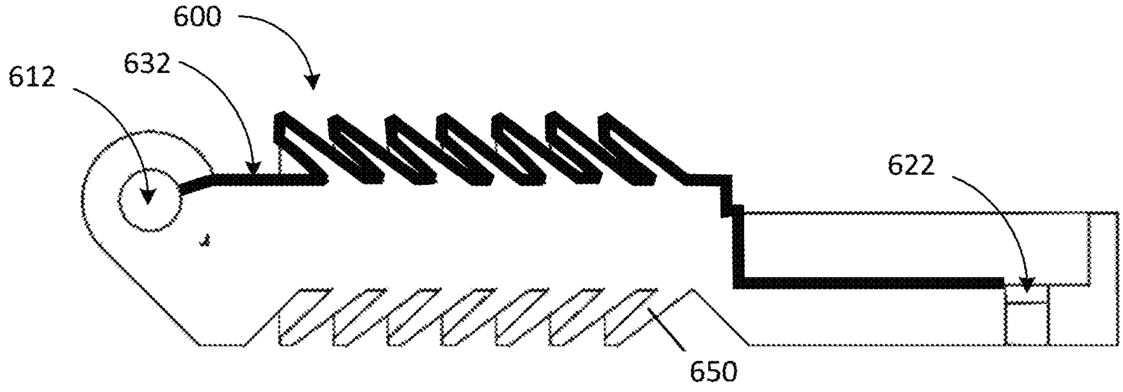

FIG. 6B depicts exemplary switching arm 600, according to certain aspects of the present disclosure. Arm 600 has a creepage distance 632, shown in the thick black line, from the bore 612 where a contact will be mounted to the vertical bore 622 that will fit onto a shaft of an actuator. Arm 600 includes a series of conical flanges 650 that increase the creepage distance 632 compared to a plain arm 120 for the same center-to-center distance between contact and actuator shaft. This example may have suitable for a switch rated for 20,000V.

Figure 7:
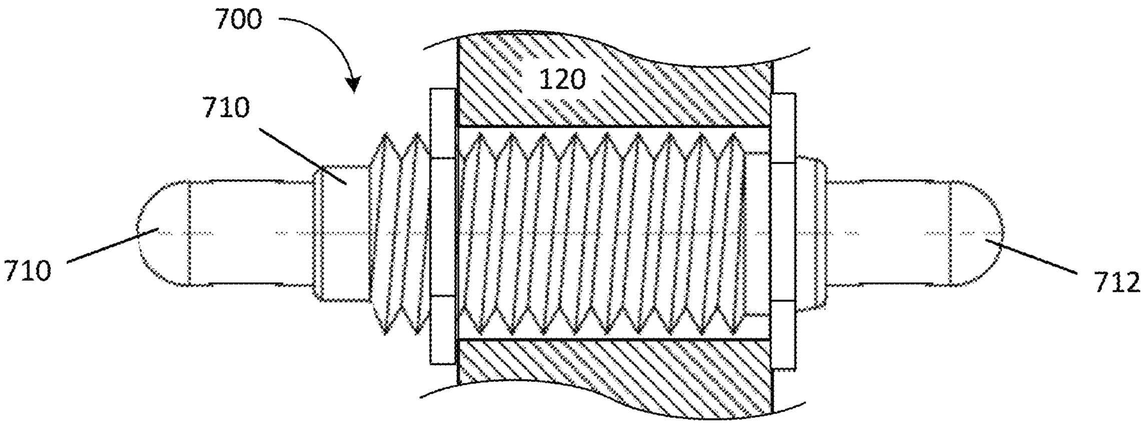
FIG. 7 depicts an exemplary compliant contact, according to certain aspects of the present disclosure.

FIG. 7 depicts an exemplary compliant contact 700, according to certain aspects of the present disclosure. The contact 700 is shown mounted in an arm 120, wherein the arm 120 is shown in cross section for clarity. The contact 700 has tips 710, 712 that protrude from opposite sides of the arm 120 such that contact 700 makes conductive contact with other contacts, for example contacts 140, 142 of FIG. 1, when in first and second positions at the end of the rotational travel of arm 120. In certain embodiments, tips 710, 712 have a radius of 1 mm or less. In certain embodiments, tips 710, 712 have a radius of 0.5 mm or less. In certain embodiments, tips 710, 712 have a surface that comprises gold. In certain embodiments, tips 710, 712 have a surface plating of gold. In certain embodiments, tips 710, 712 have a contact resistance of less than or equal to 100 milliohms. In certain embodiments, tips 710, 712 have a contact resistance of less than or equal to 50 milliohms.

Tips 710, 712 are movable with respect to body 720 that is fixed in the arm 120. In certain embodiments, tips 710, 712 have a travel stroke of at least 0.5 mm. In certain embodiments, tips 710, 712 have a travel stroke of at least 1 mm. An internal spring, not visible in FIG. 7, applies an outward force to each of the tips 710, 712, that creates a contact force between the tip and external contact when the arm has moved to a position where the tip is compressed by the external contact.

Closure of a pair of contacts with a high voltage difference between the contacts will cause arcing. Arcs form when the electrical potential between the two contacts exceeds the minimum arc voltage and the available current in the circuit exceeds minimum arc current. These values depend on many factors such as the contact interface material, distance between the contacts, and the medium between the contacts. As the gap between the contacts is reduced as a switch closes, there will be a separation distance at which the voltage difference exceeds the breakdown voltage for that gap in the surrounding gas/air/vacuum and an arc forms across the open switch contacts. Arcing causes erosion of the contacts as ions move from one contact to the other. The arcing also generates plasma in the gas between the contacts, which overheats the contacts and causes further damage. The contacts may become hot enough that they weld to each other upon contact.

If there is no series inductance in the load, an arc continues until the contacts completely close. If there is series inductance in the load, the current of the arc flowing through the inductance creates a back EMF that reduces the voltage across the open switch contacts. If the voltage is reduced enough, the arc is suppressed. The contacts are still closing, however, and the back EMF has ceased because there is no current. A new arc may form and the cycle of arcing and suppression repeats. All of this destroys the relay contacts.

Figure 8:
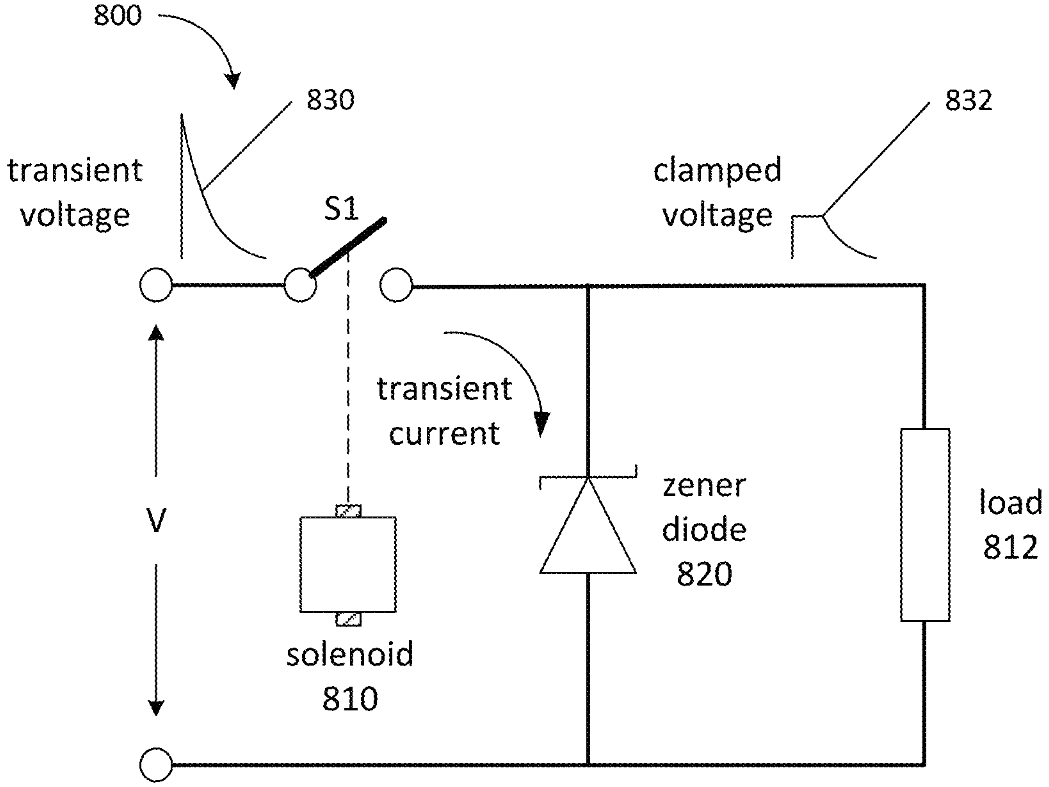
FIG. 8 depicts an exemplary clamping circuit.

FIG. 8 depicts an exemplary clamping circuit 800. The basic operational circuit is, in this example, a power source providing a voltage V and a switch S1 controlling the connection of the voltage V to a load 812. Solenoid 810 closes switch S1 when activated. There is a voltage difference across the contacts of switch S1 when the switch is open, so there is a risk of an arc forming as the contacts close. In certain circuits, closing of S1 causes a transient surge in the voltage, shown as voltage-time plot 830. A Zener diode 820 has been added across the load 812 to "clamp" this surge, thereby limiting the maximum voltage seen by the load, shown as shown in voltage-time plot 832. Other active and passive auxiliary circuits may be used to limit the transient voltage seen by the load.

One form of an arc-suppression element is to create a gas-tight enclosure around the contacts 914, 916 that excludes ambient air. In certain embodiments, the enclosure contains a vacuum, a reduced-pressure atmosphere, or a gas having a breakdown voltage that is greater than that of air. In certain embodiments, the gas is a component of air. In certain embodiments, the gas has a moisture content of a minimum level. These features raise the voltage difference that is required to form an arc while the contacts are closing and/or opening. While an arc may still form at a smaller gap, the amount of energy and the duration of the arc are reduced. This reduction in the damage to the contacts extends the service life of the switch. These switches are expensive, fragile, and subject to deterioration of the seal around the conductors, leading to air intrusion and reduction of the breakdown voltage across the contacts 914, 916.

Another form of an arc-suppression element is use of an actuator that is configured and sized to close the contacts very quickly in order to reduce the amount of energy that is dissipated during arcing as the contacts close. Conventional high-voltage relays typically quote a closure time in the range of 5-20 milliseconds. Conventional high-voltage switches typically employ a linear solenoid as the actuator in order to create the high level of force required to move the contacts within this time range.

While fast switching reduces the amount of time during which an arc can exist, it creates new problems of impact damage to the contacts and contact "bounce." Contacts may develop fatigue cracks over many cycles of impact, resulting in mechanical wear of the contact surfaces over time. Contacts bounce, i.e. close and open several times in the process of closure of the switch, because the sudden stop of the fast-moving contact transfers kinetic energy into the structure of the switch, often bending the moving arm or similar structure. The deformed arm rebounds and flexes and the moving contact may briefly separate from the stationary contact on or more times as the energy dissipates. Each of these separations is another opportunity for an arc to form between the contacts, adding to the damage. Certain conventional high-voltage switches incorporate a damper to absorb some of the kinetic energy. As such, both the high-speed actuator and the damper can be considered arc-suppression elements of a conventional high-voltage switch.

Figure 9:
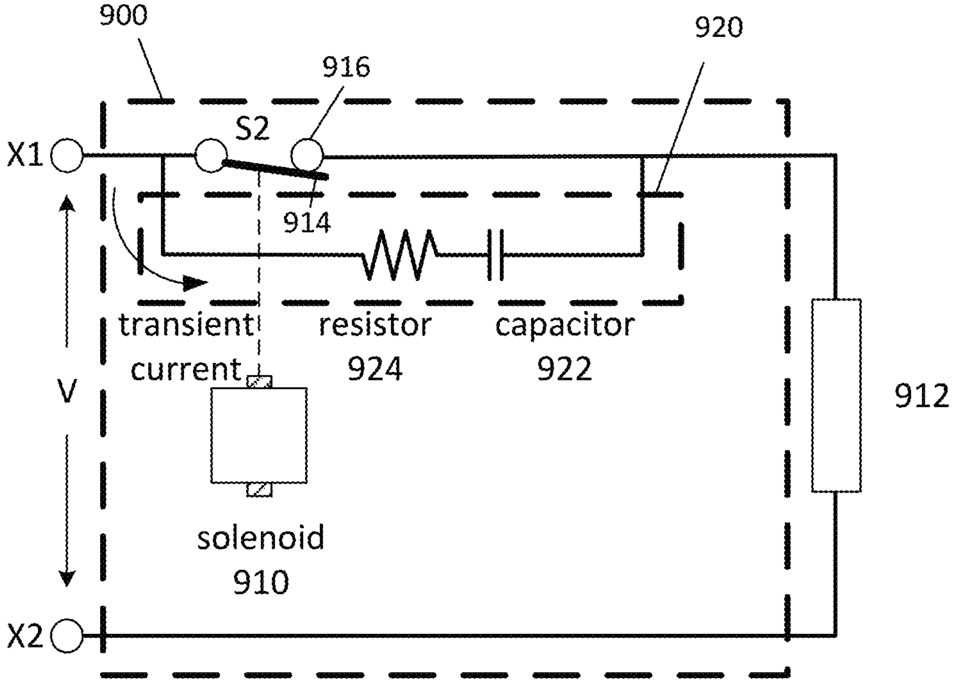
FIG. 9 depicts an exemplary snubber circuit.

FIG. 9 depicts a switch 900 with an exemplary arc-suppression, or "snubbing," circuit 920. Opening contact pair S2, for example with solenoid 910, when a high voltage is present across inputs X1 and X2 may lead to arcing between the contacts 914 and 916 because the voltage across the contacts exceeds the breakdown voltage of the initial small separation of the contacts 914, 916. This breakdown voltage is dependent on several factors, for example the gap, the gas or vacuum between the contacts, the surface finish of the contacts, etc. The arc-suppression circuit 920 comprises, in this example, a resistor 924 and a capacitor 922. In alternate embodiments, an arc-suppression circuit may active and/or passive elements such as an inductor and a semiconductor.

The switch disclosed herein does not include the arc-suppression circuit 920 or any components connected in a similar fashion to bridge the switch S2 and absorb energy to prevent or ameliorate formation of an electrical arc.

Equipment is generally considered to be "high voltage" when the voltage being switched is above 500 volts (V), although the International Electrotechnical Commission and its national counterparts (JET, IEEE, VDE, etc.) define high voltage as above 1000 V for alternating current (VAC) and above 1500 V for direct current (VDC). Arcing will damage the contacts 914, 916 and lead to a failure of the switch S2 as well as create other voltage transients that may propagate through the circuit or radiate directly to cause interference or damage to other components.

Conventional high-voltage switches include an arc-suppression element, for example the circuit shown in FIG. 9, coupled across the switch to prevent the development of an arc or reduce the effect of the arcing by drawing off the transient current upon opening of the switch S2. The simple resistor-capacitor (RC) circuit here is a simple example, which may be alternately implemented using active or passive elements.

Components in conventional circuits that are exposed to the high voltages frequently have a portion, for example a frame or case, that is connected to ground and therefore the component must be themselves rated to withstand the voltage being switched. The example solenoid 910 may need thicker insulation or special design features that raise its cost and complexity.

The disclosed high-voltage switch does not include any arc-suppression element. There are no active or passive circuit elements bridging the contacts that are to be moved into contact. There is no enclosure surrounding the contacts to modify the dielectric constant of the space between the contacts. The absence of an arc suppression feature produces a significant reduction in cost and increase in reliability for the intended application.

With reference to FIGS. 1, 2A, 2B, the motor 130 is not activated while voltage is present across any of the contacts 122, 140, 142. In certain embodiments, the motor 130 is a low-power actuator that takes more than 0.1 second to move the arm 120 from a first position, where contact 122 is in conductive contact with contact 142, to a second position, where contact 122 is in conductive contact with contact 140. In certain embodiments, the motor 130 takes more than 0.5 second to move the arm 120 from the first position to the second position. In certain embodiments, the motor 130 takes more than 1 second to move the arm 120 from the first position to the second position. Use of a low-power motor, for example a low-voltage servo motor, reduces cost and complexity of the switch while retaining the ability to switch a high voltage as the creepage and clearance between the high-voltage contacts and the low-voltage motor are sufficient in the disclosed switch to protect the low-voltage motor.

Headings and subheadings, if any, are used for convenience only and do not limit the invention.

Reference to an element in the singular is not intended to mean "one and only one" unless specifically so stated, but rather "one or more." Use of the articles "a" and "an" is to be interpreted as equivalent to the phrase "at least one." Unless specifically stated otherwise, the terms "a set" and "some" refer to one or more.

Terms such as "top," "bottom," "upper," "lower," "left," "right," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

Although the relationships among various components are described herein and/or are illustrated as being orthogonal or perpendicular, those components can be arranged in other configurations in some embodiments. For example, the angles formed between the referenced components can be greater or less than 90 degrees in some embodiments.

Although various components are illustrated as being flat and/or straight, those components can have other configurations, such as curved or tapered for example, in some embodiments.

Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "operation for."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such as an embodiment may refer to one or more embodiments and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

Although embodiments of the present disclosure have been described and illustrated in detail, it is to be clearly understood that the same is by way of illustration and example only and is not to be taken by way of limitation, the scope of the present invention being limited only by the terms of the appended claims.

What is claimed is:

1. A high-voltage switch, comprising:

a substrate;

a first contact fixedly coupled to the substrate;

a second contact having a first position in conductive contact with the first contact and a second position not in conductive contact with the first contact; and an actuator comprising a body fixedly coupled to the substrate and a movable element coupled to the second contact, the actuator configured to selectably move the second contact between the first and second positions;

wherein:

the switch has a breakdown voltage greater than or equal to 1500V;

the switch does not include an enclosure surrounding the first and second contacts; and the first and second contacts are not enclosed within the enclosure.

2. The switch of claim 1, further comprising an arm coupled between the movable element and the second contact, wherein the movable element rotates with respect to the body.

3. The switch of claim 2, wherein:

the second contact is disposed proximate to a first end of the arm; and the movable element is disposed proximate to a second end of the arm.

4. The switch of claim 1, wherein the actuator comprises a rotary actuator.

5. The switch of claim 1, wherein the actuator operates at a voltage less than 50 V.

6. The switch of claim 1, wherein the switch does not include a circuit bridging the first and second contacts.

7. The switch of claim 6, wherein the switch does not include any of a resistor, a capacitor, an inductor, and a semiconductor bridging the first and second contacts.

8. The switch of claim 1, wherein the switch is configured to take at least 0.1 second to move the second contact between its first and second positions.

9. The switch of claim 8, wherein the switch is configured to take at least 0.5 second to move the second contact between its first and second positions.

10. The switch of claim 1, wherein the switch does not include a voltage-clamping circuit across the contacts or an enclosure that surrounds the contacts and contains one of a vacuum, an inert gas, or a liquid.

* * * * *